(12) United States Patent
Wu et al.

(10) Patent No.: US 9,381,819 B2
(45) Date of Patent: Jul. 5, 2016

(54) METHOD AND APPARATUS FOR CHARGING OR DISCHARGING AND ELECTRICAL DEVICE BY CONTROLLING SWITCHES

(75) Inventors: Hongjie Wu, Canton, MI (US); Yuqing Tang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 657 days.

(21) Appl. No.: 13/171,887

(22) Filed: Jun. 29, 2011

(65) Prior Publication Data

US 2012/0091792 A1 Apr. 19, 2012

(51) Int. Cl.
*B60L 11/18* (2006.01)
*B60R 16/03* (2006.01)
*B60L 1/00* (2006.01)
H02M 1/32 (2007.01)
H02P 27/06 (2006.01)

(52) U.S. Cl.
CPC . *B60L 11/18* (2013.01); *B60L 1/00* (2013.01); *B60R 16/03* (2013.01); *H02M 2001/322* (2013.01); *H02P 27/06* (2013.01); *Y02T 10/642* (2013.01); *Y02T 10/7005* (2013.01)

(58) Field of Classification Search
CPC ...................................... B60R 16/03
USPC ................................. 307/9.1, 10.1
See application file for complete search history.

(56) References Cited

U.S. PATENT DOCUMENTS

| | | | |
|---|---|---|---|
| 5,619,107 A * | 4/1997 | Shinohara et al. | 318/139 |
| 6,384,551 B1 * | 5/2002 | Watanabe | 318/139 |
| 6,828,742 B2 * | 12/2004 | Suzuki et al. | 318/139 |
| 7,768,237 B2 | 8/2010 | Tarchinski | |
| 7,956,488 B2 * | 6/2011 | Kobayashi et al. | 307/9.1 |
| 2010/0019723 A1 | 1/2010 | Ichikawa | |
| 2010/0214055 A1 * | 8/2010 | Fuji et al. | 340/3.1 |
| 2011/0006726 A1 * | 1/2011 | Dittmer et al. | 320/101 |
| 2011/0031939 A1 * | 2/2011 | Funaba et al. | 320/166 |
| 2011/0050136 A1 * | 3/2011 | Sumi et al. | 318/400.3 |

(Continued)

FOREIGN PATENT DOCUMENTS

| | | |
|---|---|---|
| CN | 101025436 A | 8/2007 |
| CN | 101997442 A | 3/2011 |

(Continued)

OTHER PUBLICATIONS

CN First Office Action dated May 29, 2015 for CN201210225608.5.

*Primary Examiner* — Adi Amrany
(74) *Attorney, Agent, or Firm* — David B. Kelley; Brooks Kushman P.C.

(57) ABSTRACT

An apparatus for charging and discharging an electrical device in a vehicle is provided with a first power source for providing low voltage energy and a second power source for providing high voltage energy. A switch enables/disables the first power source. A first contactor includes a first winding connected to the first power source and a first switch connected to the second power source. The first contactor enables the second power source to provide the HV energy for charging the electrical device in response to the switch enabling the first power source. A second contactor includes a second winding connected to the first power source for receiving the LV energy and a second switch connected to the second power source for receiving the HV energy. The second contactor is in an open state in response to the switch enabling the first power source.

15 Claims, 2 Drawing Sheets

(56) References Cited

U.S. PATENT DOCUMENTS

| | | | |
|---|---|---|---|
| 2011/0128662 A1* | 6/2011 | Kato et al. | 361/166 |
| 2011/0278918 A1* | 11/2011 | Shindo et al. | 307/9.1 |
| 2013/0214745 A1 | 8/2013 | Funaba et al. | |

FOREIGN PATENT DOCUMENTS

| | | | | |
|---|---|---|---|---|
| JP | 2005287242 A | * | 10/2005 | H02J 7/00 |
| JP | 2008206300 A | | 9/2008 | |
| JP | 2008206313 A | | 9/2008 | |

* cited by examiner

METHOD AND APPARATUS FOR CHARGING OR DISCHARGING AND ELECTRICAL DEVICE BY CONTROLLING SWITCHES

TECHNICAL FIELD

Embodiments of the present invention generally relate to a method and apparatus for charging or discharging an electrical device in a vehicle.

BACKGROUND

Electrical energy is used as a mechanism to drive a hybrid and/or electric vehicle. To provide enough power to drive the vehicle, high voltage power may be utilized to drive one or more motors in such vehicles. It is known that the high voltage energy stored in various capacitors may need to be discharged when the vehicle shuts down or in other situations. Conventional discharge methods include an active discharge and a passive discharge to remove stored HV energy. In the active discharge, windings within the motor of the vehicle are used to discharge the energy. In the passive discharge, a resistor (i.e., bleeding resistor) is used to discharge the energy.

To reduce energy loss while the vehicle is an operational mode, it may be desirable to select a resistance of the resistor to be large. However, in order to quickly discharge energy in a passive discharge, it may be desirable for the resistance of the resistor to be small. By selecting a small resistance for the resistor to satisfy a quick passive discharge, this condition may negatively affect vehicle fuel economy.

SUMMARY

In one embodiment, an apparatus for charging and discharging an electrical device in vehicle is provided. The apparatus comprises a switch, first and second power sources, and first and second contactors. The first power source is configured to provide a low voltage. The switch is configured to enable/disable the first power source. The second power source is configured to provide a high voltage for charging the electrical device. The first contactor is operably coupled to the first power source and to the second power source, the first contactor being configured to enable the second power source to provide the high voltage for charging the electrical device in response to the switch enabling the first power source. The second contactor is operably coupled to the first power source and to the second power source, the second contactor being in an open state in response to the switch enabling the first power supply.

In another embodiment, an apparatus comprising a first contactor, a second contactor, a controller, and a capacitor is provided. The first contactor receives a low voltage from a first power source and a high voltage from a second power source. The second contactor receives the low voltage and the high voltage. The controller enables/disables a transmission of the low voltage. The capacitor receives the high voltage to store energy in response to the controller enabling the transmission of the low voltage.

In another embodiment, a method for charging an electrical device in vehicle is provided. The method comprises providing a first contactor and a second contactor and controlling the first contactor to close and the second contactor to open in response to a low voltage. The method further comprises charging the electrical device with energy from a high voltage in response to controlling the first contactor to close and the second contactor to open.

BRIEF DESCRIPTION OF THE DRAWINGS

The embodiments of the present invention are pointed out with particularity in the appended claims. However, other features of the various embodiments that are within the scope of the invention as claimed will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
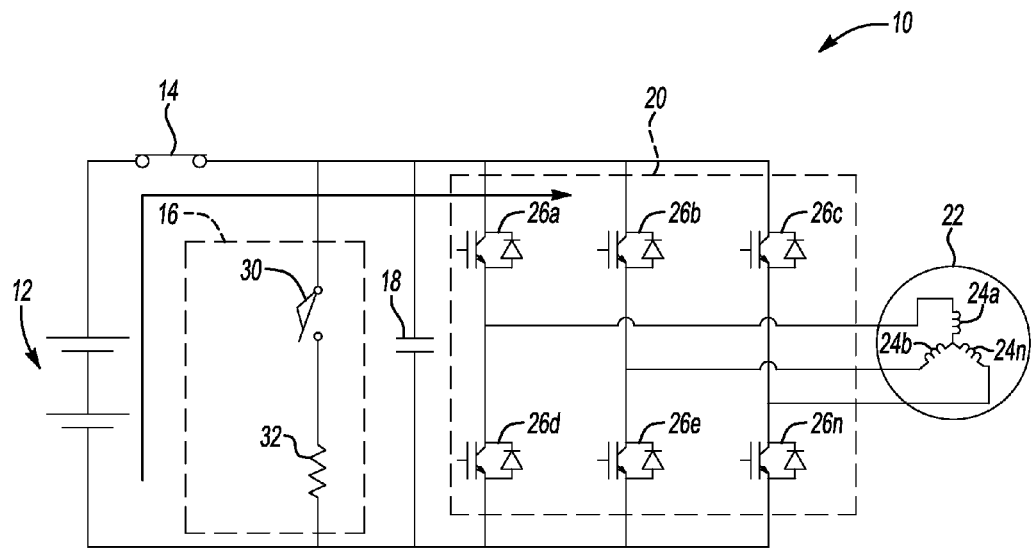
FIG. 1 depicts an apparatus in an operation mode.

FIG. 1 depicts an apparatus 10 in an operation mode. The apparatus 10 may be implemented in a hybrid or electric vehicle. It is recognized that various adaptations of the apparatus and/or methods as described herein may be used in connection with any type of vehicle that utilizes a discharge function for discharging various electrical components in any system. The apparatus 10 includes a high voltage power source 12, a contactor 14, a discharge circuit 16, a charge element 18, a bi-directional inverter/rectifier 20 (hereafter "bi-directional circuit 20"), and a motor 22. In general, the power source 12 may include any number of batteries or battery cells and is configured to generate high voltage (HV) DC energy. When the contactor 14 is closed, the HV DC energy may be transferred between the power source 12 and the motor through the bi-directional circuit 20. The bi-directional circuit 20 inverts the HV DC energy into AC energy for transfer to windings 24a-24n ("24") of the motor 22. The bi-directional circuit 20 includes a plurality of switches 26a-26n (e.g., each switch may be an insulated gate bi-polar transistor (IGBT), a field effect transistor (FET) or other suitable electronic device) that enable the DC energy to be inverted into AC energy. The motor 22 is an AC motor that may provide additional power to the vehicle, in addition to an internal combustion engine (not shown) or that may produce electrical energy in a generator mode. The apparatus 10 also enables the flow of energy back from the motor 22 back to the power source 12 to charge the power source 12.

The charge circuit 18 may be implemented as a capacitor. The capacitor 18 is arranged to buffer the HV energy between the power source 12 and the motor 22. The discharge circuit 16 includes a switch 30 and a discharge resistor 32. The operational mode is generally defined as a mode in which the motor 22 receives AC power from the bi-directional circuit 20 or a mode in which the power source 12 receives energy from the motor 22. In the operational mode, the vehicle is in a state in which it is being driven or has been started. When it is desired to transfer energy to the motor 22, a controller (not shown) controls the contactor 14 to close and the switch 30 to open such that energy flows to the motor 22. It is recognized that the switch 30 may be a transistor, IGBT, MOSFET or other suitable device that is configured to open/close to enable energy transfer therethrough when desired. The switch 30 remains open in the operational mode to prevent energy loss through the resistor 32. In the operational mode, the capacitor 18 stores at least portion of the HV energy that is generated from the power source 12. The capacitor 18 provides a transient current to the bi-directional circuit 20 to reduce voltage spikes on a HV bus and to stabilize the HV bus voltage. When it is desired to transfer energy from the motor 22 back to the power source 12, the controller controls the contactor 14 to close again and controls the switch 30 to open.

Figure 2:
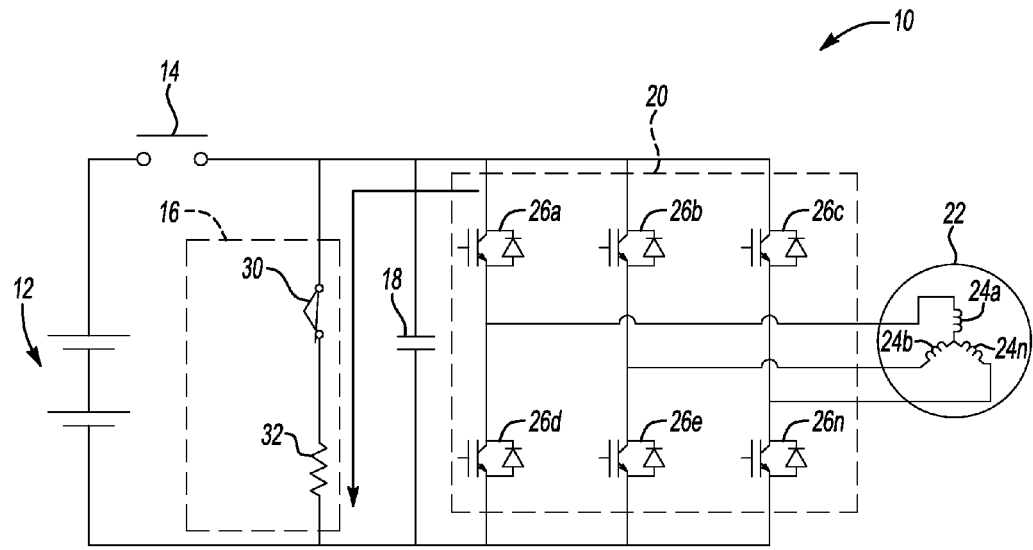
FIG. 2 depicts the apparatus in a discharge mode.

FIG. 2 depicts the apparatus 10 in the discharge mode. The discharge mode is generally defined as a mode in which the transfer of energy to and from the motor 22 is disabled (e.g., the vehicle may be shut down). In the discharge mode, the controller controls the contactor 14 to open for preventing the flow of HV energy to and from the motor 22. In addition, the controller controls the switch 30 to close and the stored energy across the capacitor 18 is discharged across the resistor 32. It is desirable in the discharge mode to discharge the energy stored on the capacitor 18 and on the motor windings 24a-24n to ensure operator safety in the event an operator services the vehicle. The resistance of the resistor 32 may be small so that energy from the capacitor 18 can be discharged in a rapid manner. The placement of the discharge circuit 16 with respect to the position of the contactor 14 may allow for a small resistance value to be selected for the resistor 32. Due to the placement of the discharge circuit 16 and the small resistance for the resistor 32, power loss in the apparatus 10 may be minimized when the apparatus 10 is in the operation mode.

Figure 3:
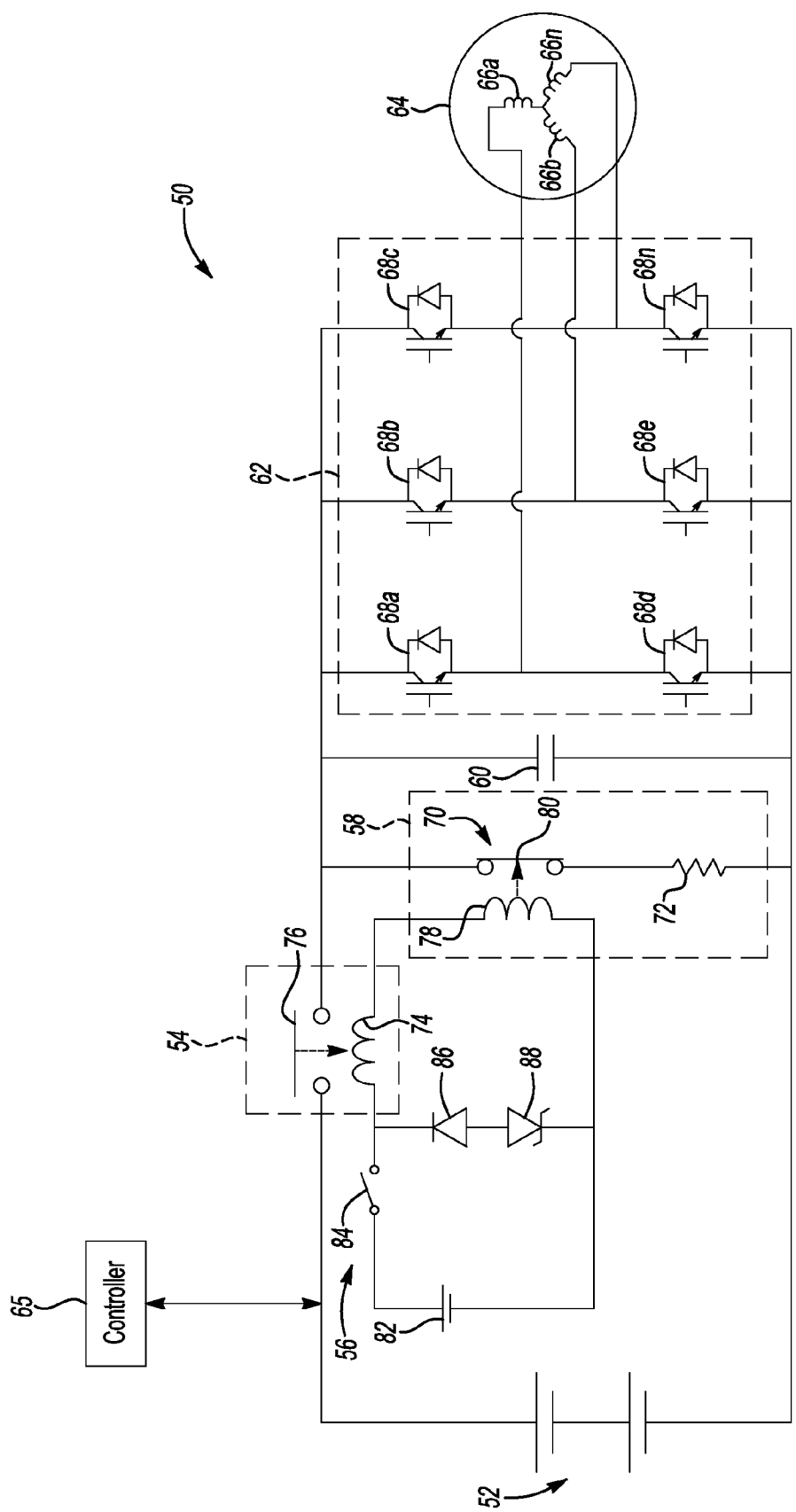
FIG. 3 depicts an apparatus in accordance to one embodiment of the present invention.

FIG. 3 depicts an apparatus 50 in accordance to one embodiment of the present invention. The apparatus 50 includes a HV power source 52, a contactor 54, a LV circuit 56, a discharge circuit 58, a capacitor 60, and a bidirectional inverter/rectifier 62 (hereafter "bi-directional circuit 62"), a motor 64 and a controller 65. In a similar manner to that described with the apparatus 10 of FIG. 1, the power source 52 generally includes any number of batteries or battery cells and is configured to provide electrical energy to the motor 64 or to store energy generated by the motor 64. The bi-directional circuit 62 includes a plurality of switches 68a-68n ("68") (such as, but not limited to, IGBTs and FETs). The plurality of switches 68 enable the DC energy to be inverted into AC energy for delivery to the motor 64. The plurality of switches 68 also enable the AC energy to be rectified into DC energy for storage on the power source 52.

The capacitor 60 buffers the HV energy between the power source 52 and the motor 64. The discharge circuit 58 includes a contactor 70 and a resistor 72. The contactor 54 and the contactor 70 may each be in the form of a mechanical relay. The contactor 54 includes a winding 74 and a switch 76 that forms the relay. The contactor 54 may be implemented as a normally open relay. The normally open relay is generally defined as the switch 76 being opened when the winding 74 is not energized. The contactor 70 includes a winding 78 and a switch 80 that forms the relay. The contactor 70 may be implemented as a normally closed relay. The normally closed relay is generally defined as the switch 80 being closed when the winding 78 is not energized. The windings 74, 78 are positioned on the LV circuit 56. The LV circuit 56 further includes a power supply 82, a switch 84, a diode 86, and a zener diode 88.

The vehicle is generally configured to operate at two voltage levels, a HV power level (e.g., approximately 150V or greater) and a LV power level (e.g., approximately 12 V or greater). The HV power source 52, the capacitor 60, the bi-directional circuit 62, the motor 64, the switch 76 of the contactor 54, the switch 80 of the contactor 70, and the resistor 72 are generally configured to operate in the high power voltage level domain. The power supply 52 may generate a voltage at 150V or greater. In general, when the controller 65 controls the switch 84 to close, the contactor 54 closes and the contactor 70 opens. In response thereto, the bi-directional circuit 62 inverts the HV energy into an AC voltage for driving the motor 64 or rectifies the AC energy into HV DC energy.

The power supply 82, the switch 84, the winding 74 of the contactor 54, the winding 78 of the contactor 70, the diode 86, and the zener diode 88 are generally configured to operate in the low power voltage level domain. The LV energy generated by the power supply 82 may generate a voltage at approximately 12 V. Various functions such as, but not limited to, vehicle heating/cooling, entertainment, locking, lights (exterior/interior) are generally driven from the power supply 82.

When the vehicle is in the operational mode, the controller 65 controls the switch 84 to close thereby causing the LV energy to be transferred to the winding 74 and the winding 78. The winding 74 generates an electromagnetic field in response to the LV energy which causes the switch 76 of the contactor 54 to close. In a similar manner, the winding 78 generates an electromagnetic field in response to the LV energy which causes the switch 80 of the contactor 70 to open (e.g., the contactor 70 is a normally open state and will close when induced by the electromagnetic field). This condition enables the HV energy to pass through the bi-directional circuit 62. The bi-directional circuit 62, in turn, inverts the DC energy into AC energy for delivery to the motor 64 or rectifies the AC energy from the motor 64 to the power source 52.

By implementing the contactor 54 and the contactor 70 as mechanical relays, this condition may physically isolate such devices and may minimize or prevent leakage current that may affect the ability for the capacitor 60 to reach a fully charged state. For example, while the contactor 70 is opened (e.g., the switch 80 is opened), leakage current generated as a result of the contactor 54 being closed may be generally prevented from passing to the resistor 72 thereby increasing the amount of energy that is capable of being transferred to the capacitor 60.

In the event the contactor 54 and the contactor 70 are implemented as solid state based switches, such devices may enable an unacceptable amount of leakage current to pass therethrough, even if the contactor 54 or the contactor were in an open state. In particular, by implementing the contactor 70 as a solid state switch, the contactor 70 may allow an undesirable amount of leakage current to flow therethrough even if in an open state. Such leakage current may increase power loss and may adversely affect fuel economy.

In the discharge mode (e.g. vehicle is shut down), the controller 65 may control the switch 84 to open thereby preventing the flow of LV energy to the winding 74 and 78. The switch 76 opens in response thereto, and the flow of energy is prevented from reaching the motor 64 (or flow of energy is prevented from being transferred from the motor 64 to the power source 52). In addition, the winding 78 is de-energized causing the switch 80 to close. As a result, energy stored across the capacitor 60 is discharged through the switch 80 of the discharge switch 58. The resistor 72 may be implemented with a small resistance to ensure rapid discharge of the energy from the capacitor 60. In addition, it is recognized that the zener diode 88 may assist in dissipating all of the energy from the windings 74 and 78. For example, the zener diode 88 may add a higher voltage drop (in addition to that added with the diode 86), which may cause the energy to dissipate faster (e.g., $P=V*I$, where V is the total voltage drop across the diode 86 and the zener diode 88). In the event the zener diode 88 is not implemented, the diode 86 may provide for a voltage drop of roughly 0.7 V after the switch 84 opens. Power consumption of the diode 86 alone may be small in this case. This may create the condition in which a longer time is needed to consume all of the energy of the windings 74 and 78 and cause a delay of the switching action of the contactor 54 and the contactor 70 when the switch 84 is opened.

It is recognized that the contactor 54, while implemented as a mechanical relay, may not allow leakage current (or may significantly reduce the potential) for leakage current to pass through capacitor 60. Such a condition may also ensure that the energy stored on capacitor 60 is discharged from the apparatus 50 within a rapid amount of time.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for charging and discharging an electrical device in a vehicle, the apparatus comprising:
   a first power source configured to provide low voltage (LV) energy;
   a switch for enabling and disabling the first power source;
   a second power source configured to provide high voltage (HV) energy for charging the electrical device;
   a first contactor comprising a first switch and a first winding, the first winding being connected to the first power source for receiving the LV energy and the first switch being connected to the second power source for receiving the HV energy, the first contactor being configured to enable the second power source to provide the HV energy to the electrical device for charging thereof in response to the switch enabling the first power source; and
   a second contactor comprising a second switch and a second winding, the second winding being connected in series with the first winding and in series with the first power source for receiving the LV energy and the second switch being connected to the second power source for receiving the HV energy, wherein the switch is connected between the first power source and at least one of the first winding and the second winding such that the second contactor is in an open state in response to the switch enabling the first power source.

2. The apparatus of claim 1 further comprising a controller configured to control the switch to enable and disable the first power source.

3. The apparatus of claim 1 wherein the first contactor is further configured to disable the second power source from providing the HV energy in response to the switch disabling the first power source.

4. The apparatus of claim 1 wherein the electrical device includes a capacitor, the capacitor being configured to store energy in response to the switch enabling the second power source to provide the HV energy.

5. The apparatus of claim 4 wherein the capacitor is further configured to discharge the energy therefrom in response to the switch disabling the second power source.

6. The apparatus of claim 5 further comprising a resistor positioned in series with the second contactor for enabling the energy to pass therethrough in response to the capacitor discharging the energy.

7. The apparatus of claim 1 wherein the first power source, the switch, the first winding and the second winding are connected to each other in a closed loop to form a low voltage circuit.

8. The apparatus of claim 1 wherein the first contactor and the second contactor are synchronized with the switch such that the first switch of the first contactor closes and the second switch of the second contactor opens in response to the switch closing and enabling the first power source.

9. An apparatus comprising:
   a low voltage circuit including a first power source for providing low voltage, a first winding connected in series with the first power source, a second winding connected in series with the first winding, and a switch connected in series between the first power source and at least one of the first winding and the second winding for enabling and disabling the first power source;
   a high voltage circuit including a second power source for providing high voltage, a capacitor connected in parallel with the second power source, a first switch connected in series between the second power source and the capacitor and coupled to the first winding such that the first switch closes to provide high voltage to the capacitor in response to the switch enabling the first power source; and
   a discharge circuit including a second switch connected in series with a resistive element, the discharge circuit being connected in parallel with the second power source and with the capacitor, the second switch being coupled to the second winding such that the second switch opens to disable the discharge circuit in response to the switch enabling the first power source.

10. The apparatus of claim 9 further comprising a first contactor including the first winding and the first switch, and a second contactor including the second winding and the second switch, wherein the first contactor and the second contactor each form a mechanical relay for physically isolating the first power source from the second power source.

11. The apparatus of claim 10 wherein the first contactor is a normally closed relay and the second contactor is a normally open relay.

12. The apparatus of claim 9 wherein the low voltage is approximately 12 volts and the high voltage is approximately 150 volts or greater.

13. The apparatus of claim 9 further comprising a controller operably coupled to the switch for controlling the switch to enable and disable the first power source.

14. The apparatus of claim 9 wherein the first switch opens to disable the second power source in response to the switch disabling the first power source.

15. The apparatus of claim 9 wherein the second switch closes to enable the discharge circuit in response to the switch disabling the first power source.

\* \* \* \* \*